Figure 1:
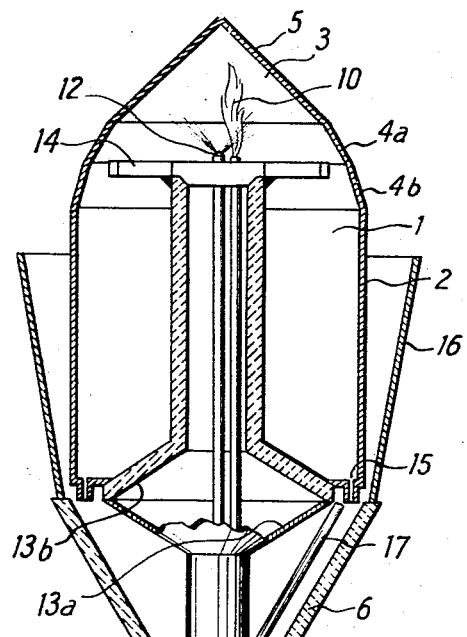

Sept. 26, 1967     M. BOUCRAUT ET AL     3,343,584
HEATING DEVICE FOR HEATING A FLUIDIZED
BED OF PULVERULENT MATERIAL
Filed May 17, 1965

Inventors
Michel Boucraut
Imre Toth by Michael S. Striker
Atty

United States Patent Office 3,343,584
Patented Sept. 26, 1967

3,343,584
HEATING DEVICE FOR HEATING A FLUIDIZED BED OF PULVERULENT MATERIAL
Michel Boucraut, Metz, and Imre Toth, Hy-Metz, France, assignors to Institut de Recherches de la Siderurgie Francaise, Seine-et-Oise Department, France
Filed May 17, 1965, Ser. No. 456,238
Claims priority, application France, Oct. 27, 1964, 992,846
16 Claims. (Cl. 158—4)

The present invention relates to a heating device adapted to be immersed in a fluidized bed of pulverulent material for heating the pulverulent material.

It is an object of the present invention to provide for a heating device for heating a fluidized bed of pulverulent material and constructed to assure an efficient heat exchange between the heating device and the pulverulent material.

It is a further object of the present invention to provide for a heating device for heating a fluidized bed of pulverulent material in which overheating of the material of the fluidized bed and possible resulting caking of the pulverulent material is positively prevented.

It is an additional object of the present invention to provide for a heating device for heating a fluidized bed of pulverulent material which is constructed of a few and simple parts so that the device can be manufactured at reasonable cost and will stand up trouble-free under extended use.

With these objects in view, the heating device according to the present invention for heating a fluidized bed of pulverulent material mainly comprises combustion chamber means having an upper closed portion and a lower open end in which at least the upper closed portion is formed by a wall of material having a high heat conductive quality, burner means in the upper portion of the combustion chamber means, conduit means communicating with the burner means for feeding combustible material to the latter, and circulating means in the upper portion of the combustion chamber means for imparting in the upper portion of the combustion chamber means a circular movement to the combustion gases emanating from the burner means to provide for an increased heat exchange between the combustion gases and the wall forming the upper portion of the combustion chamber means before the combustion gases leave the combustion chamber means through the lower open end thereof.

The device preferably includes further guide means communicating with the lower open end of the combustion chamber means for guiding the combustion gases emanating therefrom in upward direction through the bed of fluidized material. The aforementioned guide means preferably include a substantially frustoconical member diverging toward its upper end and arranged coaxially with the combustion chamber means about a lower portion of the latter. This frustoconical member of the guide means has preferably a cone angle between 12 and 36°.

The combustion chamber means preferably comprises a lower cylindrical wall portion open at the lower end and closed at the upper end thereof by a dome-shaped wall portion, which preferably comprises at least one lower frustoconical portion and an upper conical portion having a cone angle greater than that of said frustoconical portion.

The circulating means for imparting to the gases in the upper portion of the combustion chamber means a circular movement preferably comprise conduit means for feeding gas under pressure into the dome-shaped portion of the combustion chamber means and having at an upper end thereof located slightly beneath the burner means a plurality of outlet passage means extending curved in the same direction outwardly toward the dome-shaped portion of the combustion chamber means. Preferably, the last-mentioned conduit means are in the form of a conduit coaxial and surrounding the conduit which feeds combustible material to the burner means and the outer conduit preferably serves to feed heated air into the upper portion of the combustion chamber means so that the stream of heated air which surrounds the conduit leading to the burner means preheats the combustible material fed to the burner means. The portion of this outer conduit which passes through the combustion chamber means is preferably formed from refractory material and this outer conduit is formed in the region of the lower end of the combustion chamber means in such a manner so as to deflect the gases emanating from the lower open end of the combustion chamber means into the frustoconical member forming the guide means from which the combustion gases leave in upward direction through the fluidized bed surrounding the heating device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which FIG. 1 is a schematic cross section through the heating device of the present invention; and FIG. 2 is a perspective view of the burner means and the circulating means for imparting in the upper portion of the combustion chamber means a circular movement to the combustion gases emanating from the burner means.

Figure 2:
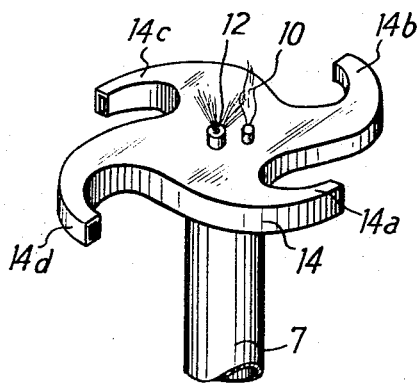

Referring now to the drawings, and more specifically to FIG. 1 of the same, it will be seen that the heating device according to the present invention mainly comprises combustion chamber means 1 having a lower cylindrical wall portion 2 open at the lower end thereof and being closed at the upper end thereof by a dome-shaped wall portion 3. The dome-shaped wall portion 3 is constituted by a pair of upwardly converging frustoconical wall portions 4a and 4b joined by and closed at the upper end by a conical portion 5. The upper frustoconical portion 4a has a larger cone angle than the lower frustoconical portion 4b, whereas the conical portion 5 has a cone angle which is larger than that of the frustoconical portion 4a. The wall portions 2, 4a, 4b and 5 of the combustion chamber are preferably formed from material having a high heat conductive quality and which is resistant to thermic shocks and non-oxidizable and these wall portions may for instance be formed from stainless steel. The lower end of the cylindrical portion 2 of the combustion chamber is formed with a plurality of substantially square cutouts 15 which extend uniformly spaced from each other upwardly from the bottom edge of the cylindrical portion 2 of the combustion chamber so as to form a plurality of spaced fingers at the lower end of the cylindrical wall portion which rest on a shoulder face of a frustoconical wall 6 concentric with the combustion chamber 1 and converging towards its lower end. The wall 6 is preferably formed from refractory material, for instance corundum. A main conduit 7 extends coaxially through the frustoconical member 6 into the combustion chamber 1 and this conduit is connected at its lower end thereof to a source of preheated air under pressure so that the conduit 7 serves to feed preheated air under pressure in a manner as will be described later on into the combustion chamber. A pair of conduit means 8 and 9, each composed of two concentric tubes, extend through the main conduit 7. The conduit means 9 is preferably arranged coaxially with the conduit 7. A burner means in form of an atomizer 12 of known construction is connected to the upper end of the conduit means 9 and the two tubes of the conduit means 9 serve respectively for feeding compressed air and fuel oil into atomizer 12 so that atomized fuel oil will emerge from the atomizer 12, which is ignited by the pilot flame 10 adjacent the atomizer 12. The pilot flame 10 is formed at the upper end of the conduit means 12, the two tubes of which feed respectively a combustible gas and compressed air to the pilot flame 10. The combustible gas passing through the inner tube of the conduit means 8 is preferably ignited by electrical igniting means of well known construction, not forming a part of the present invention, and a push button switch 11 shown in FIG. 1 serves to close an electrical circuit, not shown in the drawing, for igniting the pilot flame 10. The conduit 7 has within the frustoconical member 6 an upwardly diverging portion 13a having its largest diameter substantially in the plane of the upper end of the frustoconical member 6 and being joined at this largest diameter by a frustoconical portion 13b converging in upward direction and joined at its small diameter upper end by a tubular portion of substantially the same diameter as the lower portion of the conduit 7. The converging portion 13b and the upper tubular portion of the conduit 7 are preferably formed from corundum.

Circulating means are provided at the upper end of the conduit 7 for imparting in the upper portion of the combustion chamber 1 a circular movement to the combustion gases emanating from the atomizer or burner means 12. These means are best shown in FIG. 2 and as can be seen from FIGS. 1 and 2 a flat casing 14 closes the upper end of the conduit 7, and the casing is provided with a plurality of curved tubular outlets 14a, 14b, 14c, and 14d diminishing in cross section toward the free ends thereof and curved in such a manner that the outer portions thereof are substantially concentric with the frustoconical portion 4b in which they are located. The conduit means 8 and 9 extend with the upper ends thereof through the upper wall of the casing 14 so that the atomizer 12 and the pilot flame 10 are located slightly above the aforementioned upper wall of the casing.

An upwardly divergent frustoconical member 16 preferably of stainless steel and having a cone angle between 12 and 36°, but preferably a cone angle of 17° is connected at its lower small diameter end thereof in any convenient manner to the upper end of the frustoconical member 6 and the frustoconical member 16 at least partly surrounds the cylindrical portion 2 of the combustion chamber 1 spaced from the outer surface of the cylindrical portion as shown in FIG. 1.

A temperature sensing means 17 of known construction, not forming part of the present invention, extends into the frustoconical member 6 toward one of the openings 15 formed at the lower end of the cylindrical portion 2 of the combustion chamber for sensing the temperature of the gases passing through this opening. A tube 18 is joined to the lower end of the frustoconical member 6 and part of this tube surrounds the conduit 7 spaced from the outer surface thereof, whereas the lower end of the tube 18 leads in lateral direction away from the conduit 7.

The heating device described above will operate as follows:

A combustible gas is fed through the inner tube of conduit means 8 and combustion air is simultaneously fed through the outer tube of the conduit means 8 so that a mixture of combustible gas and air will emerge from the upper end of the conduit means 8, which mixture is ignited when an electrical circuit, not shown in the drawing, is closed by pressure on the push button 11, to form above the casing 14 a pilot flame 10. Afterwards fuel oil is fed through the inner conduit of the conduit means 9 while compressed air is fed through the outer tube of this conduit means so that atomized fuel oil which will emerge from the atomizer 12 to be ignited by the pilot flame 10. At the same time preheated air under pressure is fed through the conduit 7 which will emerge through the curved outlet passages 14a–14d of the casing 14 so as to impart to the combustion gases forming in the upper closed portion of the combustion chamber 1 a rotary circular motion. This circular motion of the combustion gases as well as the specific construction of the upper dome-shaped portion 3 of the combustion chamber 1 will result in a rapid transfer of the heat produced by the burner means to the pulverulent material of a fluidized bed in which the heating device is located. The specific construction of the dome-shaped portion 3 of the combustion chamber presents a great radiating surface which in combination with the rotary motion of the hot combustion gases in the combustion chamber will assure that the walls forming the dome-shaped portion of the combustion chamber above the burner means will be rapidly cooled so that the temperature of the walls will only be about 200 C.° higher than the particles of the fluidized bed surrounding the dome-shaped portion of the combustion chamber. Since the stream of preheated air passing through the conduit 7 surrounds the conduit means 9 through which fuel oil and compressed air is fed through the atomizer 12, this compressed air and the fuel oil will be preheated by heat exchange with the preheated air passing through the conduit 7 so that a flame of high theoretic combustion temperature will be obtained from the atomizer or burner means 12. A flame of such high theoretic combustion temperature can however also be obtained by feeding instead of compressed air, air enriched with oxygen or pure oxygen through the outer tube of the conduit means 9. A considerable portion of the heat content of the hot combustion gases forming in the dome-shaped portion of the combustion chamber is transferred through the wall of the dome-shaped portion immediately onto the fluidized pulverulent material surrounding the dome-shaped portion, whereas the remaining calories are transferred into the fluidized bed as combustion gases emanating through the outlet ends of the casing 14 pass in downward direction through the cylindrical portion 2 of the combustion chamber and through the openings 15 into the frustoconical member 16 surrounding the cylindrical portion 2 of the combustion chamber and through the upper open end of the frustoconical member 16 into the fluidized bed. The relative cool temperature of these gases passing into the fluidized bed will assure that these gases will not cause a physical deterioration of the fluidized particles and definitely prevent a baking together of the fluidized particles even if the fluidized particles are formed from siliceous minerals.

The rapid heat transfer through the walls of the dome-shaped portion of the combustion chamber 1 will also produce, when hydrocarbons are used as combustion material, combustion gases containing a mixture of CO, $CO_2$, $H_2$ and $H_2O$ and due to the rapid cooling of this mixture through the walls of the dome-shaped portion of the combustion chamber, the composition of this mixture will remain substantially stable. In this way, the combustion gases emanating through the upper end of the frustoconical member 16 will contain relatively large gas portions having reducing qualities so that the arrangement may also be used for reducing a fluidized bed of iron ore particles.

The preheated air passing at high speed through the outlet ends 14a–14d of the chamber 14 and the rapid circular movement of this air as well as of the combustion gases in the combustion chamber 1 will also prevent any formation of tar on the inner surface of the walls of the combustion chamber.

As mentioned before the converging portion 13b of the conduit means 7 deflects the gases in the combustion chamber 1 in radially outward direction towards the openings 15 at the bottom of the cylindrical portion of the combustion chamber and the gases pass through these openings into the space between the cylindrical portion 2 of the combustion chamber and the guide means formed by the frustoconical member 16.

As is known, the homogeneity of a gas mixture downstream of orifices through which the mixtures passes, increases with the pressure drop occurring in the gas mixture during the passage through the orifices, and while a homogeneous gas mixture is desirable, care has to be taken in the heating device of the present invention that the pressure loss of the gases passing through the orifices or cut outs 15 is not too great since the energy consumption of the apparatus obviously increases with the pressure loss and since an increased pressure loss may also lead to a mechanical deformation of the orifices which in turn would detrimentally effect the homogeneity of the gases passing therethrough. Tests have shown that an optimum homegeneity of gas distribution is obtained by a plurality of cut outs which are uniformly distributed along the circumference of the bottom end of the combustion chamber. The wall portions about the cut outs 15 are preferably reinforced to prevent collapse of the wall forming the combustion chamber and to guarantee that the cut outs maintain original configuration so that the gas streams passing therethrough may fluidize the pulverulent material in a bed of pulverulent material surrounding the heating device of the present invention.

Proper fluidizing in the receptacle surrounding the heating device and the speed of cooling of the dome-shaped portion of the combustion chamber will depend on the speed with which the gas streams pass into the receptacle. Tests have shown that the speed of the gases in the neighborhood of the cut outs 15 has to be superior to the minimum speed necessary to transport the particles to avoid in this way any baking together of the particles downstream of the cut outs. The speed of the gases downstream of the cut outs 15 will depend on the available space through which the gases may pass after leaving the cut outs and tests have shown that the most appropriate space or volume is a volume between the cylindrical outer surface of the lower portion of the combustion chamber and the inner surface of an upwardly diverging frustoconical member having a cone angle of 12 to 36°.

The conical end portion 5 of the dome-shaped upper portion of the combustion chamber means 1 will prevent pulverulent material to settle on the top of the combustion chamber means and the conduit 18 communicating with the bottom end of the frustoconical member 6 serves to evacuate any pulverulent material located in member 6 before start of the operation of the device.

It will be understood that each of the elements described above, or two, or more together, may also find a useful application in other types of heating devices for heating a fluidized bed of pulverulent material differing from the types described above.

While the invention has been illustrated and described as embodied in a heating device for heating a fluidized bed of pulverulent material, it is not intended to be limited to the details shown, since various modifications and structural changes may be made without departing in any way from the spirit of the present invention.

What is claimed is:

1. Device for heating and fluidizing a bed of pulverulent material comprising, in combination, combustion chamber means having an upper closed portion and a lower open end, at least said upper closed portion being formed by a wall of material having a high heat conductive quality; burner means in said upper portion of said combustion chamber means; conduit means communicating with said burner means for feeding combustible material to the latter; circulating means in said upper portion of said combustion chamber means for imparting in said upper portion of said combustion chamber means a circular movement to the combustion gases emanating from said burner means to provide for an increased heat exchange between said combustion gases and said wall forming said upper portion of said combustion chamber means before the combustion gases leave said combustion chamber means through said lower open end thereof; and guide means communicating with said lower open end of said combustion chamber means for guiding the combustion gases emanating therefrom in upward direction.

2. Device for heating and fluidizing a bed of pulverulent material comprising, in combination, combustion chamber means having an upper closed portion and a lower open end, at least said upper closed portion being formed by a wall of material having a high heat conductive quality; burner means in said upper portion of said combustion chamber means; conduit means communicating with said burner means for feeding combustible material to the latter; circulating means in said upper portion of said combustion chamber means for imparting in said upper portion of said combustion chamber means a circular movement to the combustion gases emanating from said burner means to provide for an increased heat exchange between said combustion gases and said wall forming said upper portion of said combustion chamber means before the combustion gases leave said combustion chamber means through said lower open end thereof; and guide means communicating with said lower open end of said combustion chamber means for guiding the combustion gases emanating therefrom in upward direction, said guide means including a substantially frustoconical member diverging toward the upper end thereof and being arranged coaxially with said combustion chamber means about a lower portion of the latter.

3. Device for heating and fluidizing a bed of pulverulent material comprising, in combination, combustion chamber means having an upper closed portion and a lower open end, at least said upper closed portion being formed by a wall of material having a high heat conductive quality; burner means in said upper portion of said combustion chamber means; conduit means communicating with said burner means for feeding combustible material to the latter; circulating means in said upper portion of said combustion chamber means for imparting in said upper portion of said combustion chamber means a circular movement to the combustion gases emanating from said burner means to provide for an increased heat exchange between said combustion gases and said wall forming said upper portion of said combustion chamber means before the combustion gases leave said combustion chamber means through said lower open end thereof; and guide means communicating with said lower open end of said combustion chamber means for guiding the combustion gases emanating therefrom in upward direction, said guide means including a substantially frustoconical member having a cone angle between 12 and 36°, said frustoconical member diverging toward the upper end thereof and being arranged coaxially with said combustion chamber means about a lower portion of the latter.

4. Device for heating and fluidizing a bed of pulverulent material comprising, in combination, combustion chamber means having a lower cylindrical wall portion open at the lower end thereof and closed at the upper end by a dome-shaped wall portion, at least said dome-shaped wall portion being formed by a wall of material having a high heat conductive quality; burner means in said upper portion of said combustion chamber means; conduct means communicating with said burner means for feeding combustible material to the latter; circulating means in said upper portion of said combustion chamber means for imparting in said upper portion of said combustion chamber means a circular movement to the combustion gases emanating from said burner means to provide for an increased heat exchange between said combustion gases and said wall forming said upper portion of said combustion chamber means before the combustion gases leave said combustion chamber means through said lower open end thereof; and guide means communicating with said lower open end of said combustion chamber means for guiding the combustion gases emanating therefrom in upward direction, said guide means including a substantially frustoconical member diverging toward the upper end thereof and being arranged coaxially with said combustion chamber means about a lower portion of the latter.

5. Device for heating and fluidizing a bed of pulverulent material comprising, in combination, combustion chamber means having a lower cylindrical wall portion open at the lower end thereof and closed at the upper end of a dome-shaped wall portion, at least said dome-shaped wall portion being formed by a wall of material having a high heat conductive quality, said dome-shaped wall portion comprising a lower frustoconical portion and an upper conical portion having a cone angle greater than that of said frustoconical portion; burner means in said upper portion of said combustion chamber means; conduit means communicating with said burner means for feeding combustible material to the latter; circulating means in said upper portion of said combustion chamber means for imparting in said upper portion of said combustion chamber means a circular movement to the combustion gases emanating from said burner means to provide for an increased heat exchange between said combustion gases and said wall forming said upper portion of said combustion chamber means before the combustion gases leave said combustion chamber means through said lower open end thereof; and guide means communicating with said lower open end of said combustion chamber means for guiding the combustion gases emanating therefrom in upward direction, said guide means including a substantially frustoconical member diverging toward the upper end thereof and being arranged coaxially with said combustion chamber means about a lower portion of the latter.

6. Device for heating and fluidizing a bed of pulverulent material comprising, in combination, combustion chamber means having a lower cylindrical wall portion open at the lower end thereof and closed at the upper end by a dome-shaped wall portion, at least said dome-shaped wall portion being formed by a wall of material having a high heat conductive quality; burner means in said upper portion of said combustion chamber means; conduit means communicating with said burner means for feeding combustible material to the latter; circulating means in said upper portion of said combustion chamber means for imparting in said upper portion of said combustion chamber means a circular movement to the combustion gases emanating from said burner means to provide for an increased heat exchange between said combustion gases and said wall forming said upper portion of said combustion chamber means before the combustion gases leave said combustion chamber means through said lower open end thereof, said circulating means comprising conduit means for feeding a gas under pressure into said dome-shaped portion of said combustion chamber means and having at an upper end thereof located beneath said burner means a plurality of outlet passage means extending curved in the same direction outwardly toward the dome-shaped portion of said combustion chamber means; and guide means communicating with said lower open end of said combustion chamber means for guiding the combustion gases emanating therefrom in upward direction, said guide means including a substantially frustoconical member diverging toward the upper end thereof and being arranged coaxially with said combustion chamber means about a lower portion of the latter.

7. Device for heating and fluidizing a bed of pulverulent material comprising, in combination, combustion chamber means having a lower cylindrical wall portion open at the lower end thereof and an upper dome-shaped wall portion closing the upper end of said cylindrical wall portion, at least said dome-shaped wall portion being formed from material having a high heat conductive quality; burner means located along the axis of said combustion chamber means in said dome-shaped portion thereof beneath the upper end of said combustion chamber means; first conduit means extending coaxially through said combustion chamber means and communicating with said burner means for feeding combustible material to the latter; circulating means in said upper portion of said combustion chamber means for imparting in said upper portion of said combustion chamber means a circular movement to the combustion gases emanating from said burner means and including second conduit means coaxially surrounding said first conduit means for feeding preheated air under pressure into said combustion chamber means, said second conduit means having an upper portion located in said dome-shaped portion of said combustion chamber means beneath said burner means and having at said upper portion a plurality of outlet conduits located substantially in a plane normal to the axis of said second conduit means and end portions of reduced cross section all curved in the same direction along substantially circular portions coaxial with said wall portions of said combustion chamber means; and guide means communicating with said lower open end of said combustion chamber means for guiding the gases emanating from said lower end of said combustion chamber means in upward direction, said guide means including a substantially frustoconical member diverging toward the open end thereof and being arranged coaxially with said combustion chamber means about said cylindrical portion thereof.

8. A device as set forth in claim 7 wherein said cylindrical portion of said combustion chamber means is formed at the lower end thereof with a plurality of cut-outs equally spaced from each other providing passages for the flow of gases from the interior of said combustion chamber means into said frustoconical member forming said guide means.

9. Device for heating and fluidizing a bed of pulverulent material comprising, in combination, combustion chamber means having a lower cylindrical wall portion open at the lower end thereof and an upper dome-shaped wall portion closing the upper end of said cylindrical wall portion, at least said dome-shaped wall portion being formed from material having a high heat conductive quality; burner means located along the axis of said combustion chamber means in said dome-shaped portion thereof beneath the upper end of said combustion chamber means; first conduit means extending coaxially through said combustion chamber means and communicating with said burner means for feeding combustible material to the latter; circulating means in said upper portion of said combustion chamber means for imparting in said upper portion of said combustion chamber means a circular movement to the combustion gases emanating from said burner means and including second conduit means coaxially surrounding said first conduit means for feeding preheated air under pressure into said combustion chamber means, said second conduit means having an upper portion located in said dome-shaped portion of said combustion chamber means beneath said burner means and having at said upper portion a plurality of outlet conduits located substantially in a plane normal to the axis of said second conduit means and end portions of reduced cross section all curved in the same direction along substantially circular portions coaxial with said wall portions of said combustion chamber means, said second conduit means having an enlarged portion permitting expansion of the heated air passing therethrough; and guide means communicating with said lower open end of said combustion chamber means for guiding the gases emanating from said lower end of said combustion chamber means in upward direction, said guide means including a substantially frustoconical member diverging toward the open end thereof and being arranged coaxially with said combustion chamber means about said cylindrical portion thereof.

10. Device for heating and fluidizing a bed of pulverulent material comprising, in combination, combustion chamber means having a lower cylindrical wall portion open at the lower end thereof and an upper dome-shaped wall portion closing the upper end of said cylindrical wall portion, at least said dome-shaped wall portion being formed from material having a high heat conductive quality; burner means located along the axis of said combustion chamber means in said dome-shaped portion thereof beneath the upper end of said combustion chamber means; first conduit means extending coaxially through said combustion chamber means and communicating with said burner means for feeding combustible material to the latter; circulating means in said upper portion of said combustion chamber means for imparting in said upper portion of said combustion chamber means a circular movement to the combustion gases emanating from said burner means and including second conduit means coaxially surrounding said first conduit means for feeding preheated air under pressure into said combustion chamber means, said second conduit means having an upper portion located in said dome-shaped portion of said combustion chamber means beneath said burner means and having at said upper portion a plurality of outlet conduits located substantially in a plane normal to the axis of said second conduit means and end portions of reduced cross section all curved in the same direction along substantially circular portions coaxial with said wall portions of said combustion chamber means, said second conduit means having an enlarged portion permitting expansion of the heated air passing therethrough, said enlarged portion of said second conduit means comprising a lower upwardly diverging frustoconical portion and an upper upwardly converging frustoconical portion joined at their largest diameters in the region of the lower open end of said combustion chamber means to each other so that the outer surface of said converging upper portion deflects the gases emanating from the lower end of said combustion chamber means in radially outward direction; and guide means communicating with said lower open end of said combustion chamber means in the region of said largest diameters of said frustoconical portions of said second conduit means for guiding the gases emanating from said lower end of said combustion chamber means in upward direction, said guide means including a substantially frustoconical member diverging toward the open end thereof and being arranged coaxially with said combustion chamber means about said cylindrical portion thereof.

11. A device as set forth in claim 10, wherein the portion of said second conduit means located in said combustion chamber is formed from refractory material.

12. A device as set forth in claim 4, wherein said wall portions of said combustion chamber means are formed from non-oxidizable material resistant to thermic shock and having high heat conductive qualities.

13. A device as set forth in claim 4, wherein said wall portions of said combustion chamber means are made from stainless steel.

14. A device as set forth in claim 1, wherein said burner means includes an atomizer and in which said conduit means include a pair of coaxial conduits for feeding fuel oil and compressed air into said atomizer.

15. A device as set forth in claim 13 and including pilot flame means arranged adjacent said atomizer and including additional conduit means for supplying said pilot flame means with air and a combustible gas.

16. A device as set forth in claim 1 and including temperature sensing means at the lower end of said combustion chamber means.

References Cited

UNITED STATES PATENTS

| | | | |
|---|---|---|---|
| 1,259,059 | 3/1918 | Waterbury | 126—360 X |
| 2,748,846 | 6/1956 | Smith et al. | 158—28 |
| 3,187,740 | 6/1965 | Jones et al. | 126—91 |
| 3,266,485 | 8/1966 | Girton | 126—360 |

FOREIGN PATENTS

| | | |
|---|---|---|
| 537,657 | 7/1941 | Great Britain. |

FREDERICK L. MATTESON, JR., *Primary Examiner.*

DONLEY J. STOCKING, *Examiner.*

E. G. FAVORS, *Assistant Examiner.*